(12) United States Patent
Malek et al.

(10) Patent No.: US 8,628,140 B2
(45) Date of Patent: Jan. 14, 2014

(54) FRONT END OF A MOTOR VEHICLE

(75) Inventors: Thomas Malek, Pulheim (DE); Vasant Pednekar, Cologne (DE); Ulrich Dajek, Leverkusen (DE); Hans-Walter Weyer, Bergisch Gladbach (DE); Jens Menke, Allersberg (DE); Bérénice Cottens, Ingolstadt (DE)

(73) Assignees: Faurecia Kunststoffe Automobilsysteme GmbH, Gaimersheim (DE); Lanxess Deutschland GmbH, Köln (DE)

( * ) Notice: Subject to any disclaimer, the term of this patent is extended or adjusted under 35 U.S.C. 154(b) by 0 days.

(21) Appl. No.: 13/378,724

(22) PCT Filed: Oct. 29, 2010

(86) PCT No.: PCT/EP2010/066484
§ 371 (c)(1),
(2), (4) Date: Mar. 6, 2012

(87) PCT Pub. No.: WO2011/054754
PCT Pub. Date: May 12, 2011

(65) Prior Publication Data
US 2012/0280536 A1  Nov. 8, 2012

(30) Foreign Application Priority Data
Nov. 5, 2009 (DE) .......................... 10 2009 052 110

(51) Int. Cl.
*B60J 7/00* (2006.01)
(52) U.S. Cl.
USPC .................................................. 296/193.01

(58) Field of Classification Search
USPC ................. 296/193, 193.09, 187.01, 193.01; 293/115, 120, 144, 146; 264/242, 245, 264/250, 251, 255, 328.1, 328.8
See application file for complete search history.

(56) References Cited

U.S. PATENT DOCUMENTS

| 3,800,016 | A | * | 3/1974 | Roberts | ......................... 264/45.3 |
| 3,829,007 | A | * | 8/1974 | Ellison | ........................... 383/104 |
| 4,251,086 | A | * | 2/1981 | Woolley | ...................... 280/11.12 |

(Continued)

FOREIGN PATENT DOCUMENTS

| CN | 1491157 A | 4/2004 |
| EP | 1213207 A1 | 6/2002 |
| EP | 1884451 A1 | 2/2008 |
| KR | 10-2007-0049323 | 5/2007 |

OTHER PUBLICATIONS

Korean Office Action.
Korean Office Action (English Translation).

(Continued)

*Primary Examiner* — Kiran B Patel
(74) *Attorney, Agent, or Firm* — Timothy X. Gibson, Esq.; Gibson & Dernier LLP

(57) ABSTRACT

The invention relates to a front end of a motor vehicle, consisting of at least one main body and at least a first thermoplastic part and a second thermoplastic part, which are securely connected by injection molding firstly to the main body and simultaneously the various plastics parts are securely connected to one another, wherein the two plastics parts consist of different plastics materials and these are injection molded according to the bi-injection process and fuse with one another when they encounter one another.

20 Claims, 5 Drawing Sheets

(56) References Cited

U.S. PATENT DOCUMENTS

| | | | |
|---|---|---|---|
| 4,406,489 A * | 9/1983 | Trabert | 293/115 |
| 4,492,063 A * | 1/1985 | Schock et al. | 52/309.7 |
| 4,780,345 A * | 10/1988 | Gray | 428/36.5 |
| 4,809,618 A * | 3/1989 | Bell | 108/57.28 |
| 4,945,682 A * | 8/1990 | Altman et al. | 49/502 |
| 5,915,780 A * | 6/1999 | Kobrehel et al. | 296/146.15 |
| 6,663,172 B2 * | 12/2003 | Weiss et al. | 296/216.08 |
| 6,780,365 B2 | 8/2004 | Goldbach | |
| 6,874,831 B1 * | 4/2005 | Pouget et al. | 293/115 |
| 6,973,984 B2 * | 12/2005 | Cheron et al. | 180/68.1 |
| 7,258,385 B2 * | 8/2007 | Andre et al. | 296/64 |
| 7,278,680 B2 * | 10/2007 | Burnham | 296/193.09 |
| 7,287,809 B2 * | 10/2007 | Andre | 296/187.09 |
| 7,540,543 B2 * | 6/2009 | Kemp et al. | 293/112 |
| 7,571,957 B2 * | 8/2009 | Povinelli et al. | 296/193.09 |
| 7,644,966 B2 * | 1/2010 | Huber et al. | 293/155 |
| 8,080,296 B2 * | 12/2011 | Malek et al. | 428/35.8 |
| 8,109,560 B2 * | 2/2012 | Joly-Pottuz | 296/187.04 |
| 8,118,351 B2 * | 2/2012 | Gonin et al. | 296/193.09 |
| 8,235,433 B2 * | 8/2012 | Gonin | 293/120 |
| 8,251,437 B2 * | 8/2012 | Gonin et al. | 296/187.09 |
| 8,267,446 B2 * | 9/2012 | Gonin | 293/132 |
| 8,383,242 B2 * | 2/2013 | Malek et al. | 428/458 |
| 2002/0015310 A1 * | 2/2002 | Pickholz | 362/487 |
| 2002/0017807 A1 * | 2/2002 | Sigonneau et al. | 296/203.02 |
| 2002/0070062 A1 * | 6/2002 | Joutaki et al. | 180/68.4 |
| 2002/0109263 A1 * | 8/2002 | Goldbach | 264/271.1 |
| 2003/0107241 A1 * | 6/2003 | Ritchie et al. | 296/188 |
| 2004/0011513 A1 * | 1/2004 | Haneda et al. | 165/148 |
| 2004/0145208 A1 * | 7/2004 | Kapteyn | 296/70 |
| 2004/0222670 A1 * | 11/2004 | Andre et al. | 296/193.09 |
| 2007/0102903 A1 | 5/2007 | Kong | |
| 2007/0267236 A1 * | 11/2007 | Wilson et al. | 180/68.4 |
| 2008/0061601 A1 * | 3/2008 | Hemmersmeier | 296/193.03 |
| 2008/0230291 A1 * | 9/2008 | Kersting | 180/68.4 |
| 2009/0026806 A1 * | 1/2009 | Riviere et al. | 296/193.09 |
| 2009/0201691 A1 * | 8/2009 | Breisacher | 362/505 |
| 2009/0202761 A1 * | 8/2009 | Malek et al. | 428/35.7 |
| 2010/0133880 A1 * | 6/2010 | Spieth et al. | 296/193.09 |
| 2010/0163324 A1 * | 7/2010 | Jyoutaki et al. | 180/68.1 |
| 2010/0187865 A1 * | 7/2010 | Malek et al. | 296/203.03 |
| 2010/0213742 A1 * | 8/2010 | Ritz | 296/193.09 |
| 2011/0011661 A1 * | 1/2011 | Takahashi et al. | 180/68.4 |
| 2011/0057480 A1 * | 3/2011 | Usoro et al. | 296/193.1 |
| 2011/0115241 A1 * | 5/2011 | Gonin | 293/120 |
| 2011/0121586 A1 * | 5/2011 | Gonin | 293/132 |
| 2011/0156414 A1 * | 6/2011 | Gonin et al. | 293/132 |
| 2011/0254311 A1 * | 10/2011 | Dajek et al. | 296/146.6 |
| 2011/0285174 A1 * | 11/2011 | Malek et al. | 296/193.02 |
| 2011/0304174 A1 * | 12/2011 | Iammarino et al. | 296/187.09 |
| 2012/0019025 A1 * | 1/2012 | Evans et al. | 296/193.1 |
| 2012/0261205 A1 * | 10/2012 | Iania | 180/274 |
| 2013/0070471 A1 * | 3/2013 | Pickholz | 362/520 |

OTHER PUBLICATIONS

Office Action for corresponding Chinese Patent Application No. 201080039732.1, dated Nov. 11, 2013.

* cited by examiner

FRONT END OF A MOTOR VEHICLE

The invention relates to a front end of a motor vehicle, consisting of at least one main body and at least a first thermoplastic part and a second thermoplastic part, which are securely connected by injection molding firstly to the main body and simultaneously the various plastics parts are connected to one another, wherein the two plastics parts consist of different plastics materials and these are injection molded according to the bi-injection process and fuse with one another when they encounter one another.

The production of front ends of motor vehicles in a plastic-metal hybrid construction is known from the prior art.

Both EP 1 211 163 A2, EP 1 211 164 A2 and EP 1 213 207 A1 describe such front ends, which are composed of an upper metal support and a lower metal support connected to one another by plastics segments.

FR 2 805 504 A1 also describes a front end for automobiles having additional shock absorbers, in which use can be made of a metal-plastic composite.

Further front ends of motor vehicles were subsequently developed for undertaking additional tasks, such as the accommodation of a bumper unit as per WO 02/36414 A1 or a pedestrian protection apparatus as per DE 10 2004 030 794 A1. In this case, too, reference is made to the configuration of the component as a metal-plastic composite.

The accommodation of further functional elements, such as the integration of a crash-box or the installation of an outer skin element which can deform in the event of a crash, is likewise made possible by the metal-plastic hybrid technology according to EP 2 039 592 A1 or EP 1 627 800 A2.

The front ends of motor vehicles described in the prior art have the disadvantage that, when there is a need to perform various functions, functional elements using one and the same plastic are molded onto the front end. In EP 1 211 164 A2, one and the same plastic serves to connect the upper support and the lower support to one another and simultaneously as the frame for the headlights or as the fastening point for the hood catch. Despite there being a very wide variety of functions, only one plastic is used.

In WO 02/064 343 A1, therefore, a front module of a motor vehicle is produced by using multicomponent injection molding, in which front module the main body consists of steel sheet, the headlight supports consist of an unreinforced, amorphous thermoplastic material, such as for example a polycarbonate-ABS mixture, and the cooling module support consists of a glass-fiber-reinforced thermoplastic, such as polyamide.

In multicomponent technology, a distinction is made between the following:
- Bi-injection, i.e. a simultaneous or time-shifted injection of two or more components into the same cavity.
- Core-back processes, i.e. the injection of two or more components in sequence, where the cavity for the second component is made available by withdrawing a sliding barrier.
- Transfer processes, i.e. using a preform which is transferred into a second cavity or into a second machine before the second component is injected.
- Sandwich processes, i.e. the construction of layers with an outer skin/core, where the layers are injected in succession.

A disadvantage of the component used in WO 02/064 343 A1 is the enlargement/extension of the main body which is necessary in order to separate the cavities from one another. As a result, the use of the plastics components in line with demand is limited to the regions around the main body. The transition from one plastics component to the other plastics component accordingly cannot be achieved without a main body being present locally. The main body is therefore also extended into regions which are subjected to less loading. In this case, the potential to save weight cannot be exploited optimally/completely.

It is an object of the invention to provide a front end of a motor vehicle which makes it possible to save further weight compared to the prior art, without having to accept losses in functionality and with the same mechanical performance.

According to the invention, the object is achieved by the provision of a front end of a motor vehicle which is produced by bi-injection, wherein one or more parts of a main body are inserted into an injection mold and the various plastics parts are connected firstly to the main body and simultaneously or secondly the various plastics parts are securely connected to one another. This makes it possible to simultaneously inject different plastics into the same cavity or cavities, and produces a structural component having a plastics component or optionally a plastic-metal hybrid component for regions subjected to high levels of loading and also a plastics component made of another material for functional regions subjected to less loading or no loading.

The invention relates to a front end of a motor vehicle, consisting of at least one main body, preferably made of metal or a high-strength plastics material, particularly preferably of metal, and at least a first thermoplastic part and a second thermoplastic part, which are securely connected by injection molding firstly to the surface of the main body and simultaneously the various plastics parts are securely connected to one another, wherein the two plastics parts consist of different plastics materials and these fuse with one another when they encounter one another in a bi-injection process.

The front end of a motor vehicle according to the invention is obtained by inserting the main body or main bodies into a multicomponent injection mold having at least two separate melt flow-way systems and at least one cavity, and subsequently simultaneously injecting the different plastics into the same cavity or the same cavities, wherein at least one plastic is securely connected to the main body at the surface thereof but also the two different plastics are securely connected to one another.

For clarification, it should be noted that the scope of the invention encompasses all of the definitions and parameters listed within the context of the present description, given in general terms or stated in preferred ranges, and in any desired combinations.

A front end of a motor vehicle according to the invention can have the form shown in FIG. 1, for example, in which the differently shaded regions represent different plastics and the zig-zag-shaped illustrations represent molded-on reinforcing ribs. The metal main bodies required for such an exemplary front end of a motor vehicle are shown in FIG. 3. In FIG. 1, ribs and peripheral moldings of different plastics are molded onto these main bodies.

In a preferred embodiment, the present invention relates to a front end of a motor vehicle which consists of an upper front-end support consisting in turn of at least one main body, preferably of metal. In a further, preferred embodiment, the invention relates to a front end of a motor vehicle in which a multipart main body is used, the individual parts of the main body being connected to one another by the injection-molding process via a thermoplastic part.

A particularly preferred embodiment involves a front end of a motor vehicle composed of an upper front-end support with at least two side supports connected vertically thereto, which form an inverted U having an accommodating space for a cooling module.

The invention very particularly preferably relates to a front end of a motor vehicle having an interlocking connection between at least one plastic and the main body, in particular an edge of the main body which makes it possible for this plastics part to be displaced on the main body in at least one direction, preferably in the longitudinal direction of the plastics part. Regions which are exposed to high levels of loading in later use and regions which are exposed to lower levels of loading in later use can therefore be applied or produced on the main body in a mold by the selection of different plastics.

In a further, very particularly preferred embodiment, the upper front-end support is lengthened toward both sides, as shown in FIG. 1, by two connection supports.

In an embodiment which is in particular very particularly preferred, the accommodating space for the cooling module is additionally delimited by a lower front-end support, which in turn forms a rectangular front end of a motor vehicle together with the two side supports and the upper front-end support.

In further, preferred embodiments, the front end of a motor vehicle according to the invention, as shown in FIG. 1, can have additional vertical front-end supports 4 fitted to the side supports for fastening mounting flanges (see FIG. 1, shown as a rectangle each with four boreholes).

As shown in FIG. 3, it is preferable to use mounting flanges made of metal which, according to FIG. 1, are encapsulated with plastics ribs by injection molding.

In addition, in a further, preferred embodiment of the front end of a motor vehicle according to the invention, it is possible to provide additional functionalities by appropriately molding-on a plastic.

Additional functionalities according to the present invention are in particular a hood catch, crash-box(es), headlight supports or middle struts which divide the cooling module accommodating space.

In a further, preferred embodiment, the connection supports on the upper front-end support are connected thereto by a rib-like reinforcing structure, which likewise consists of molded-on plastic (see FIG. 1).

In a further, preferred embodiment, the side supports and/or the lower front-end support and also further functional element connections and/or side supports are additionally reinforced by rib-like, molded-on reinforcing structures (see the view from the rear of a front end according to the invention in FIG. 4).

FIG. 5 shows the same front end of a motor vehicle as FIG. 4 in the view from the front.

In a particularly preferred embodiment, the upper front-end support, the connection supports, the side supports and also the lower front-end support have a shell-like configuration, such that they can receive the rib structure produced from plastic. In relation to the configuration of such components, reference is made to EP 0 370 342 A1, for example.

The metal used for the main body or the main bodies is preferably a metal from the group consisting of steel, aluminum or magnesium or an alloy of these metals with other metals. In an alternative embodiment, the main body can, however, also consist of a high-strength plastics material, in particular of organic sheet. The use of organic sheet in structural components is disclosed, for example, in DE 20 2006 019 341 A1. Its production is described for example in DE 10 2006 013 685 A1 or in DE 10 2004 060 009 A1.

According to the invention, at least two different plastics are securely connected by injection molding both to the main body and also to one another, by the bi-injection process. The bi-injection process is known to a person skilled in the art. By way of example, reference is made to WO 2006/003 325 A1 for the use of the bi-injection process in automobile construction.

In the further embodiments, for the sake of clarity, there are assumed to be two thermoplastics, but this does not exclude the possibility of combining a much larger number of plastics in the present invention.

The present invention preferably relates to a front end of a motor vehicle in which the fusion of the two plastics takes place during the bi-injection process within the same cavity where they encounter one another.

At least one plastic from the group consisting of polyamide, polyester, polypropylene or possible mixtures of the polymers mentioned is preferably selected as the thermoplastic to be injection molded.

Within the context of the present invention, "a plurality of plastics" or "various plastics" mean at least two different plastics, the expression "different plastics" here meaning polymers from the abovementioned group but also plastics based on the same polymer but with a different content of filler and/or reinforcing substance.

In one embodiment variant, a multipart main body is used, the individual parts of the main body being connected to one another by the injection-molding process via a thermoplastic part, and the front end of a motor vehicle produced in this way having a different plastic in regions which are exposed to high levels of loading in later use than in regions which are exposed to lower levels of loading in later use, with the different plastics being securely connected to one another.

Within the context of the present invention, "different thermoplastics" are not only plastics which differ on account of their chemical structure, but also plastics based on the same polymer of which one has a lower and the other has a higher content of filler or reinforcing substance.

In one embodiment variant, the present invention therefore also relates to front ends of motor vehicles of the type described above, where the plastics material of the first plastics part differs from the plastic of the second plastics part in the content of fillers and/or reinforcing substances. According to the invention, any of the abovementioned polymers can be provided with fillers and/or reinforcing substances, however.

If fillers and/or reinforcing substances are used, preference is given to talc, mica, silicate, quartz, titanium dioxide, wollastonite, kaolin, amorphous silicas, magnesium carbonate, chalk, feldspar, barium sulfate, glass beads and/or fibrous fillers and/or reinforcing substances based on carbon fibers and/or glass fibers. It is particularly preferable to use mineral particulate fillers based on talc, mica, silicate, quartz, titanium dioxide, wollastonite, kaolin, amorphous silicas, magnesium carbonate, chalk, feldspar, barium sulfate and/or glass fibers. It is preferable in particular to use mineral particulate fillers based on talc, wollastonite, kaolin and/or glass fibers, very particular preference being given to glass fibers.

In particular for applications which require isotropic dimensional stability and a high thermal dimensional stability, preference is given to using mineral fillers, in particular talc, wollastonite or kaolin.

Particular preference is moreover also given to the use of acicular mineral fillers. According to the invention, the term "acicular mineral fillers" means a mineral filler having pronounced acicular character. An example that may be mentioned is acicular wollastonites. The length:diameter ratio of the mineral is preferably from 2:1 to 35:1, particularly preferably from 3:1 to 19:1, with particular preference from 4:1 to 12:1. The average particle size, determined using a CILAS GRANULOMETER, of the acicular minerals according to the invention is preferably smaller than 20 μm, particularly preferably smaller than 15 μm, with particular preference smaller than 10 μm.

The filler and/or reinforcing substance can, if appropriate, have been surface-modified, for example with a coupling agent or coupling-agent system, for example based on silane. However, this pre-treatment is not essential. However, in particular when glass fibers are used it is also possible to use polymer dispersions, film-formers, branching agents and/or glass-fiber-processing aids, in addition to silanes.

The glass fibers whose use is particularly preferred according to the invention are added in the form of continuous-filament fibers or in the form of chopped or ground glass fibers, their fiber diameter generally being from 7 to 18 μm, preferably from 9 to 15 μm. The fibers can have been provided with a suitable size system and with a coupling agent or coupling-agent system, for example based on silane.

Coupling agents based on silane and commonly used for the pre-treatment are silane compounds, preferably silane compounds of the general formula (I)

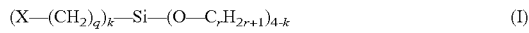

in which
X is $NH_2-$, $HO-$ or

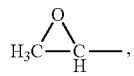

q is a whole number from 2 to 10, preferably from 3 to 4,
r is a whole number from 1 to 5, preferably from 1 to 2, and
k is a whole number from 1 to 3, preferably 1.

Coupling agents to which further preference is given are silane compounds from the group consisting of aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating for modification of the fillers is from 0.05 to 2% by weight, preferably from 0.25 to 1.5% by weight and in particular from 0.5 to 1% by weight, based on the mineral filler.

The d97 or d50 value of the particulate fillers can, as a result of the processing to give the molding composition or to give the molding, be smaller in the molding composition or in the molding than that of the fillers originally used. The length distributions of the glass fibers can, as a result of the processing to give the molding composition or to give the molding, be shorter in the molding composition or in the molding than those originally used.

The different plastics can comprise respectively from 0.001 to 70 parts by weight of the fillers individually or in a mixture with other fillers/reinforcing substances, preferably from 15 to 65 parts by weight, particularly preferably from 30 to 60 parts by weight, with particular preference from 30 to 65 parts by weight.

In every case, the amount of filler differs when the same polymer is used in the plastics to be used. However, when different polymers are used in the two plastics, the amount of filler present can certainly be identical.

If the same thermoplastic polymer is used in the two plastics, the difference in filler content of the two thermoplastics is from 0:70 to 70:0 parts by weight, preferably from 15:65 to 65:15 parts by weight, particularly preferably from 30:60 to 60:30 parts by weight.

If different plastics are used, it is preferable to use combinations of the PA-PBT or PA-PP group as the thermoplastic polymers, where PA is polyamide, PBT is polybutylene terephthalate and PP is polypropylene.

In a preferred embodiment, the thermoplastics to be used can comprise at least one compatibilizer, a component material which is capable, by way of a physical process, of bonding critical materials such as, for example, polypropylene to the polyamide or else vice versa. Compatibilizers to be used are described by way of example in DE 4 206 191 A1 or U.S. Pat. No. 6,541,571 B1.

Polyamides to be used with preference according to the invention are semicrystalline polyamides (PA), which can be prepared starting from diamines and dicarboxylic acids and/or from lactams having at least 5 ring members, or from corresponding amino acids. Starting materials that can be used for this purpose are aliphatic and/or aromatic dicarboxylic acids, such as adipic acid, 2,2,4- and 2,4,4-trimethyladipic acid, azelaic acid, sebacic acid, isophthalic acid, terephthalic acid, and aliphatic and/or aromatic diamines, e.g. tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, e.g. aminocaproic acid, and the corresponding lactams. Copolyamides composed of a plurality of the monomers mentioned are included.

Polyamides preferred according to the invention are prepared from caprolactams, very particularly preferably from ε-caprolactam, and also most of the compounding materials based on PA6, on PA66, and on other aliphatic and/or aromatic polyamides or copolyamides, where there are from 3 to 11 methylene groups for every polyamide group in the polymer chain.

Semicrystalline polyamides to be used according to the invention can also be used in a mixture with other polyamides and/or with further polymers.

Conventional additives, preferably mold-release agents, stabilizers and/or flow aids, can be admixed in the melt with the polyamides or applied to the surface.

Polyesters which are likewise preferred for use according to the invention are those based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are described in the literature. Their main chain comprises an aromatic ring which derives from the aromatic dicarboxylic acid. There may also be substitution in the aromatic ring, preferably by halogen, in particular chlorine and bromine, or by $C_1-C_4$-alkyl groups, in particular methyl, ethyl, iso- or n-propyl, or n-, iso- or tert-butyl groups.

These polyalkylene terephthalates may be prepared by reacting aromatic dicarboxylic acids, or their esters or other ester-forming derivatives, with aliphatic dihydroxy compounds in a known manner.

Preferred dicarboxylic acids that may be mentioned are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Polyesters whose use is very particularly preferred are polyalkylene terephthalates derived from alkanediols having from 2 to 6 carbon atoms. Among these, particular preference is given to polyethylene terephthalate (PET), polypropylene terephthalate and polybutylene terephthalate (PBT), and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of polyesters whose use is preferred according to the invention is generally in the range from 50 to 220, preferably from 8 to 160 (measured in a 0.5% strength by weight solution in a phenol/o-dichlorobenzene mixture in a ratio by weight of 1:1 at 25° C.) in accordance with ISO 1628.

Particular preference is given to polyesters whose carboxy end group content is up to 100 meq/kg of polyester, preferably up to 50 meq/kg of polyester and particularly preferably up to 40 meq/kg of polyester. Polyesters of this type may be prepared, for example, by the process of DE-A 44 01 055. The carboxy end group content is usually determined by titration methods (e.g. potentiometry).

If polyester mixtures are used, the molding compositions comprise a mixture composed of polyesters, i.e. additionally polyesters which differ from PBT, an example being polyethylene terephthalate (PET).

It is also advantageous to use recycled materials, such as for example PA recyclates or PET recyclates (also termed scrap PET), if appropriate mixed with polyalkylene terephthalates, such as PBT.

Recycled materials are generally:
1) Those known as post-industrial recycled materials: these are production wastes during polycondensation or during processing, e.g. sprues from injection molding, start-up material from injection molding or extrusion, or edge trims from extruded sheets or foils.
2) Post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may be either pelletized or in the form of ground material. The edge length should not be more than 10 mm, preferably less than 8 mm.

Because polyesters undergo hydrolytic cleavage during processing (due to traces of moisture), it is advisable to predry the recycled material. The residual moisture content after drying is preferably <0.2%, in particular <0.05%.

Another group that may be mentioned of polyesters whose use is preferred is that of fully aromatic polyesters derived from aromatic dicarboxylic acids and aromatic dihydroxy compounds.

Suitable aromatic dicarboxylic acids are the compounds previously mentioned for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula (II)

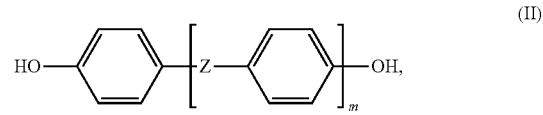

(II)

where
Z is an alkylene or cycloalkylene group having up to 8 carbon atoms, an arylene group having up to 12 carbon atoms, a carbonyl group, a sulfonyl group, an oxygen or sulfur atom, or a chemical bond, and where
m is from 0 to 2.

The phenylene groups of the compounds may also have substitution by $C_1$-$C_6$-alkyl or -alkoxy groups and fluorine, chlorine or bromine.

Examples of parent compounds for these compounds are dihydroxybiphenyl, di(hydroxyphenyl)alkane, di(hydroxyphenyl)cycloalkane, di(hydroxyphenyl) sulfide, di(hydroxyphenyl) ether, di(hydroxyphenyl) ketone, di(hydroxyphenyl) sulfoxide, α,α'-di(hydroxyphenyl)dialkylbenzene, di(hydroxyphenyl) sulfone, di(hydroxybenzoyl)benzene, resorcinol, and hydroquinone, and also the ring-alkylated and ring-halogenated derivatives of these.

Among these, preference is given to 4,4'-dihydroxybiphenyl, 2,4-di(4'-hydroxyphenyl)-2-methylbutane, α,α'-di(4-hydroxyphenyl)-p-diisopropylbenzene, 2,2-di(3'-methyl-4'-hydroxyphenyl)propane, and 2,2-di(3'-chloro-4'-hydroxyphenyl)propane, and in particular to 2,2-di(4'-hydroxyphenyl)propane, 2,2-di-phenone, 4,4'-dihydroxydiphenyl sulfone and 2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known and are described in the literature, e.g. in U.S. Pat. No. 3,651,014. Corresponding products are also available commercially, e.g. Hytrel® (DuPont).

According to the invention, materials whose use is preferred as polyesters also include halogen-free polycarbonates. Examples of suitable halogen-free polycarbonates are those based on diphenols of the general formula (III)

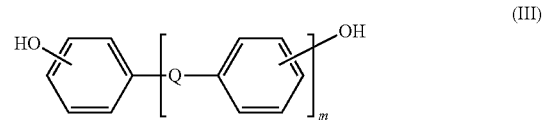

(III)

where
Q is a single bond, a $C_1$-$C_8$-alkylene, a $C_1$-$C_3$-alkylidene, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable, and preference is given to the copolycarbonates of bisphenol A, as well as to bisphenol A homopolymer.

The suitable polycarbonates may be branched in a known manner, specifically and preferably by incorporating from 0.05 to 2.0 mol %, based on the total of the diphenols used, of at least trifunctional compounds, especially those having three or more than three phenolic OH groups.

Polycarbonates which have proven particularly suitable have relative viscosities $\eta_{rel}$ of from 1.10 to 1.50, in particular from 1.25 to 1.40. This corresponds to an average molecular weight $M_w$ (weight-average) of from 10 000 to 200 000 g/mol, preferably from 20 000 to 80 000 g/mol.

The diphenols of the general formula are known or can be prepared by known processes.

The polycarbonates may, for example, be prepared by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates, see for example DE-A 33 34 782).

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

Within the context of the present invention, halogen-free polycarbonates are polycarbonates composed of halogen-free diphenols, of halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing within the context of the invention. Polycarbonates of this type with contents of hydrolyzable chlorine at the ppm level are halogen-free polycarbonates within the context of the present invention.

Other suitable thermoplastic polymers that may be mentioned are amorphous polyester carbonates, where during the preparation process phosgene has been replaced by aromatic dicarboxylic acid units, such as isophthalic acid and/or terephthalic acid units. Reference may be made at this point to EP-A 0 711 810 for further details.

EP-A 0 365 916 describes other suitable copolycarbonates having cycloalkyl radicals as monomer units.

It is also possible for bisphenol A to be replaced by bisphenol TMC. Polycarbonates of this type are obtainable from Bayer AG with the trademark APEC HT®.

In a further aspect, the invention relates to a process for producing a front end of a motor vehicle having at least one main body and at least a first thermoplastic part and a second thermoplastic part, wherein the first and second plastics parts consist of different plastics materials, wherein the front end is produced by an injection-molding process, the injection-molding process being a bi-injection process, wherein the first and second thermoplastic parts are produced by the injection-molding process and are thereby securely connected to the surface of the main body, and wherein simultaneously the different plastics materials fuse with one another as a result of the injection-molding process when they encounter one another and are thereby securely connected to one another.

According to one embodiment of the invention, at least one of the plastics of the plastics parts forms an interlocking connection with the main body.

According to one embodiment of the invention, at least one of the plastics of the plastics parts forms the interlocking connection with an edge of the main body which makes it possible for this plastics part to be displaced on the main body in at least one direction, preferably in the longitudinal direction of the plastics part.

According to one embodiment of the invention, the fusion of the two different plastics takes place within the same cavity or cavities where they encounter one another.

According to one embodiment of the invention, the main body consists of metal or a high-strength plastics material.

According to one embodiment of the invention, the metal used for the main body is steel, aluminum or magnesium or alloys of these metals with other metals.

According to one embodiment of the invention, at least one plastic from the group consisting of polyamide, polyester, polypropylene or possible mixtures of the polymers mentioned is selected as the plastic.

According to one embodiment of the invention, the plastics materials to be processed differ in the content of fillers and/or reinforcing substances.

According to one embodiment of the invention, a multipart main body is used, the individual parts of the main body being connected to one another by the injection-molding process via one of the thermoplastic parts.

In a further aspect, the invention relates to a front end of a motor vehicle produced by a process as described above.

The invention is explained in greater detail hereinbelow, with reference to the figures, by the examples, which however do not restrict the invention.

EXAMPLES

Figure 1:
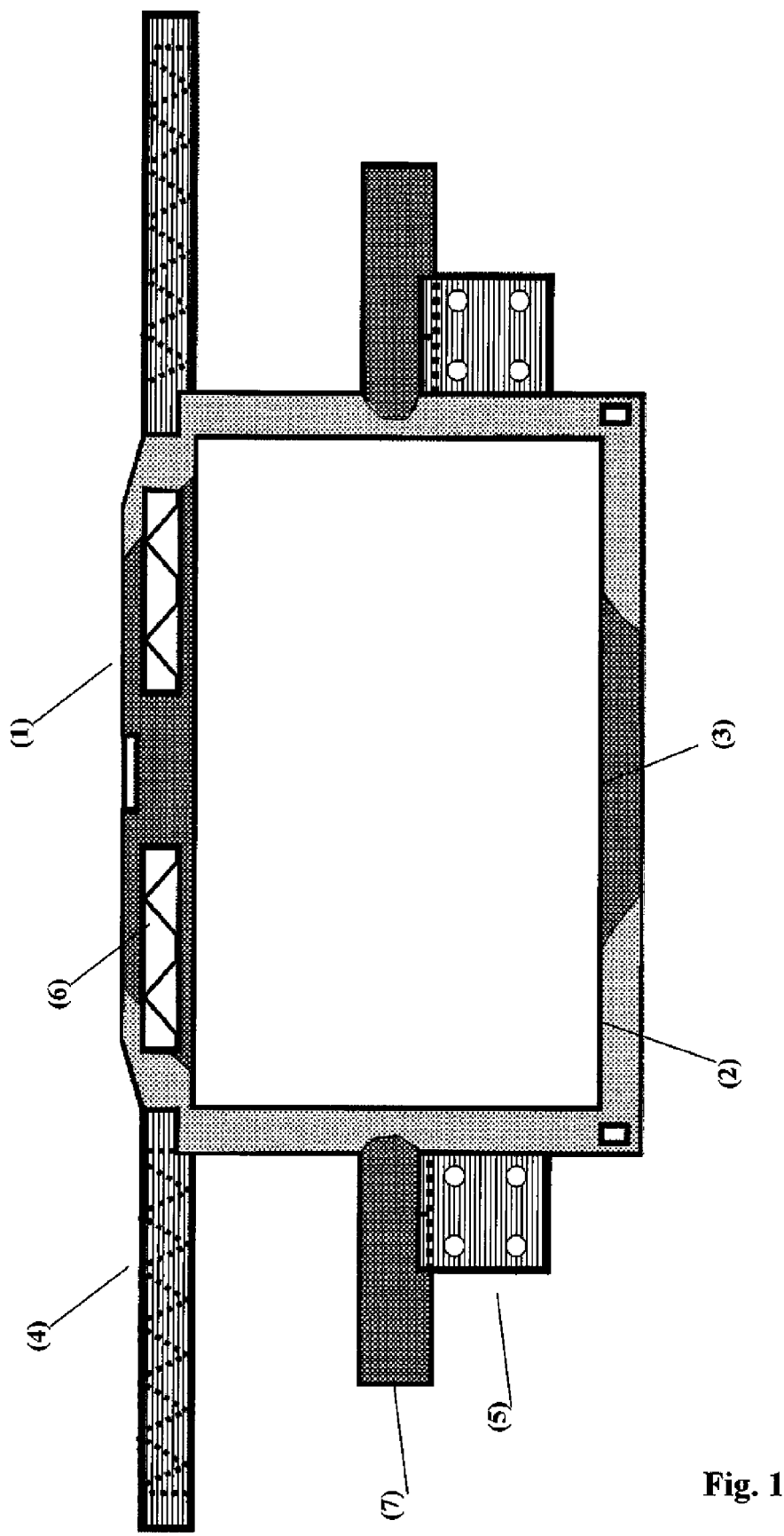
FIG. 1 shows the support structure for a front end of a motor vehicle according to the invention, consisting of the main body (1) of 4 steel sheets, of a glass-fiber-reinforced thermoplastic (polyamide) with 30% glass fibers (2) and of a glass-fiber-reinforced thermoplastic (polyamide) with 60% glass fibers (3).

FIG. 1 shows the support structure for a front end of a motor vehicle according to the invention, consisting of the main body 1 of four steel sheets 4 and 5, of a glass-fiber-reinforced thermoplastic (polyamide) with 30% glass fibers 2 and of a glass-fiber-reinforced thermoplastic (polyamide)

with 60% glass fibers 3. The shell-like main body 1 preferably consists of deep-drawn steel sheet, aluminum sheet or else plastic.

Figure 3:
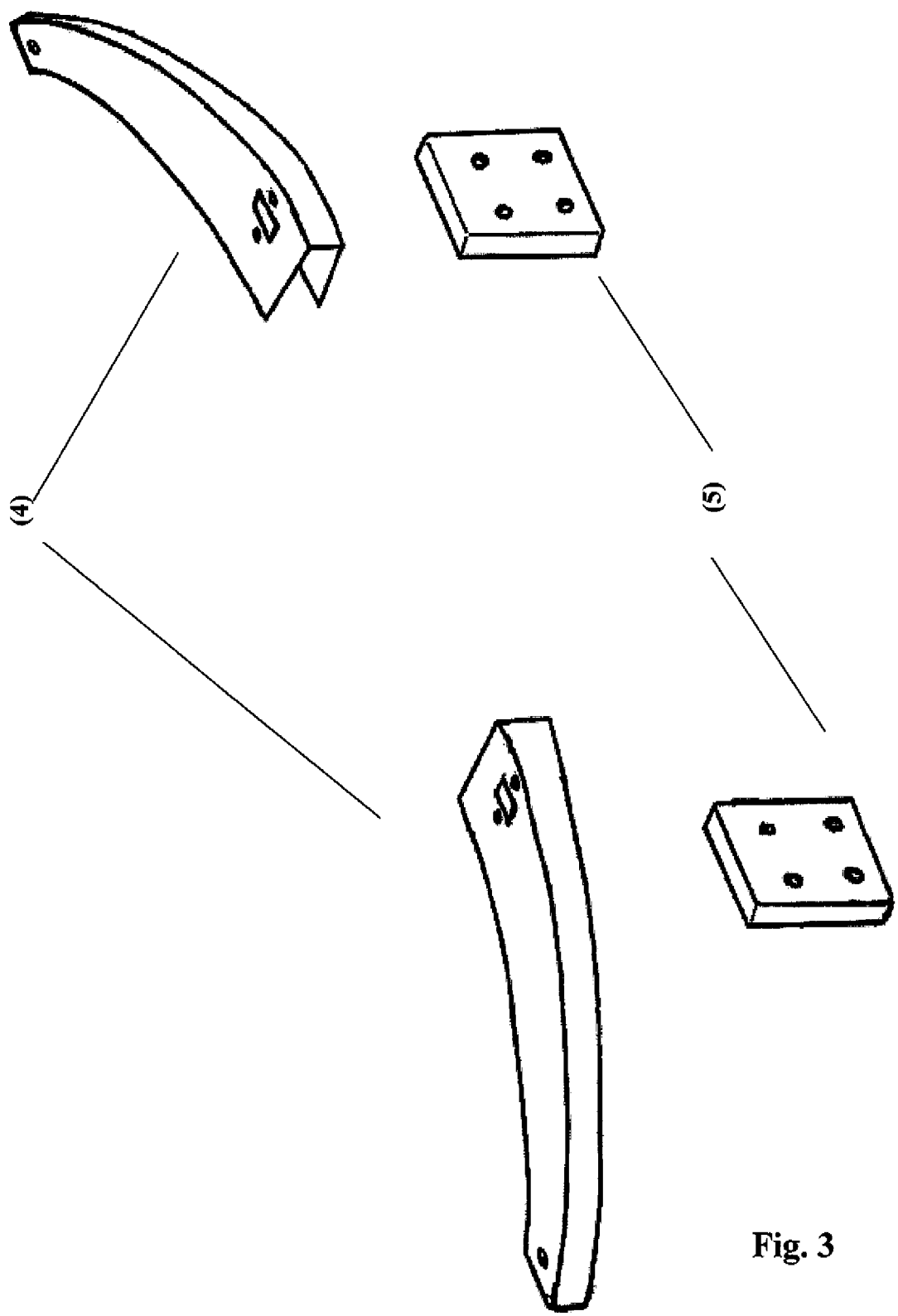
FIG. 3 shows the main body as a multipart metal insert for the front end of a motor vehicle as shown in FIG. 1 and FIG. 2.

The main body 1 is shown in detail in FIG. 3. As can be seen from FIG. 3, the main body comprises two vertical front-end supports 5, which have fastening holes for fastening to the motor vehicle body. The main body also comprises the two connection supports 4, which are bent to the rear with respect to the plane of the drawing in FIG. 3 and can likewise be used to fix the front end on the motor vehicle body.

Both the steel sheets of the vertical front-end supports 5 and the steel sheets of the connection supports 4 protrude laterally from the frame, which is formed by the two plastics 2 and 3 that have fused with one another. In FIG. 1, the frame is rectangular—but here it is likewise possible for the frame to have any desired structure, e.g. a trapezoidal structure.

The two plastics 2 and 3 have, for example, a different hardness, and therefore they can serve optimally for stiffening individual segments of the support structure. Thus, in FIG. 1, the middle regions are formed by the plastic 3, which has a significantly higher content of glass fiber than the plastic 2 in the other regions. As a result, the middle regions are particularly well reinforced.

Figure 4:
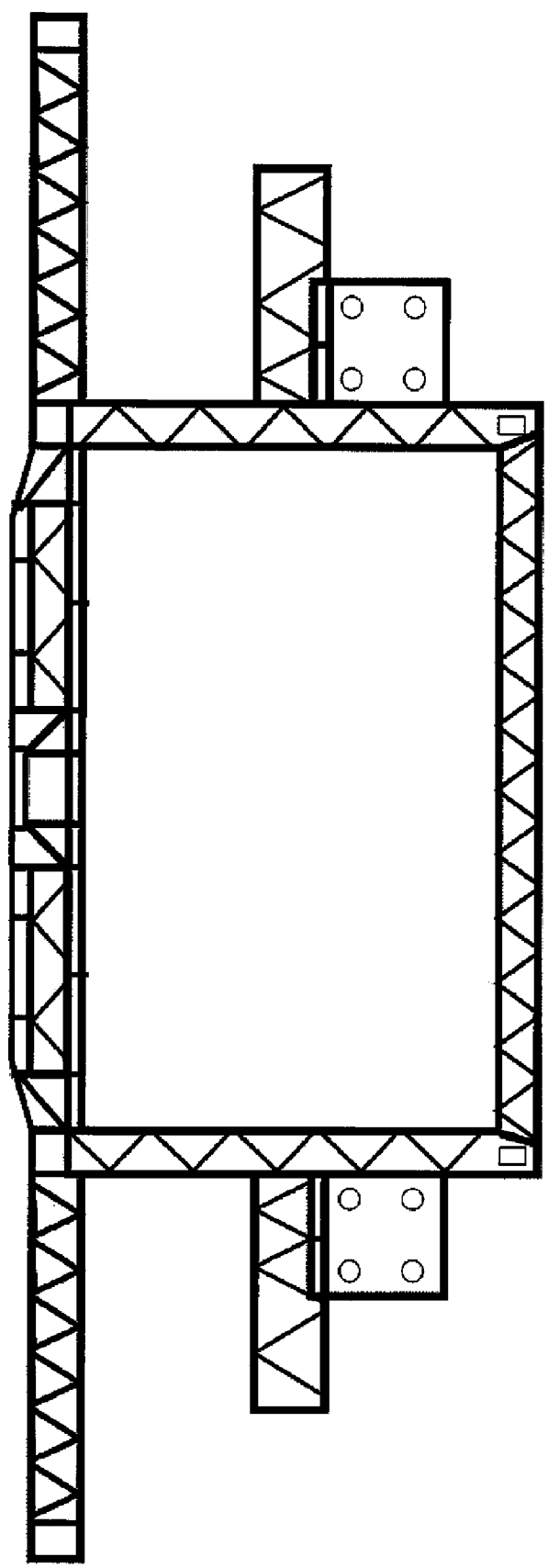
FIG. 4 is a view from the rear showing the front end of a motor vehicle as shown in FIG. 1, with ribbed reinforcing structures.

It is thus decisive in FIG. 1 that the main body 1 is encapsulated at least partially by the plastics 2 and/or 3 by injection molding. In addition, some regions of the main body 1 are stiffened by ribbed reinforcing structures, as can be seen in detail in FIG. 4. In this respect, FIG. 4 shows a view from the rear of FIG. 1. The ribbed structure increases the stability of the support structure. As can also be seen from FIG. 4, all elements of the support structure which comprise plastics are provided with the ribbed structure.

The regions 6 of the support structure are cutouts in the plastic serving, for example, for the conduction of air. In order for the stability of the support structure to be maintained despite the presence of cutouts, the cutouts are also provided with reinforcing ribs.

Further guide parts 7 which are made of plastic and protrude laterally from the plastics frame can also be seen in FIG. 1. These guide parts serve, for example, for the connection of bumpers or as a support for the headlights. In FIG. 1, the guide parts are likewise produced from the high-strength plastic 3 and have fused together with the plastic 2 of the lateral frame parts.

Figure 5:
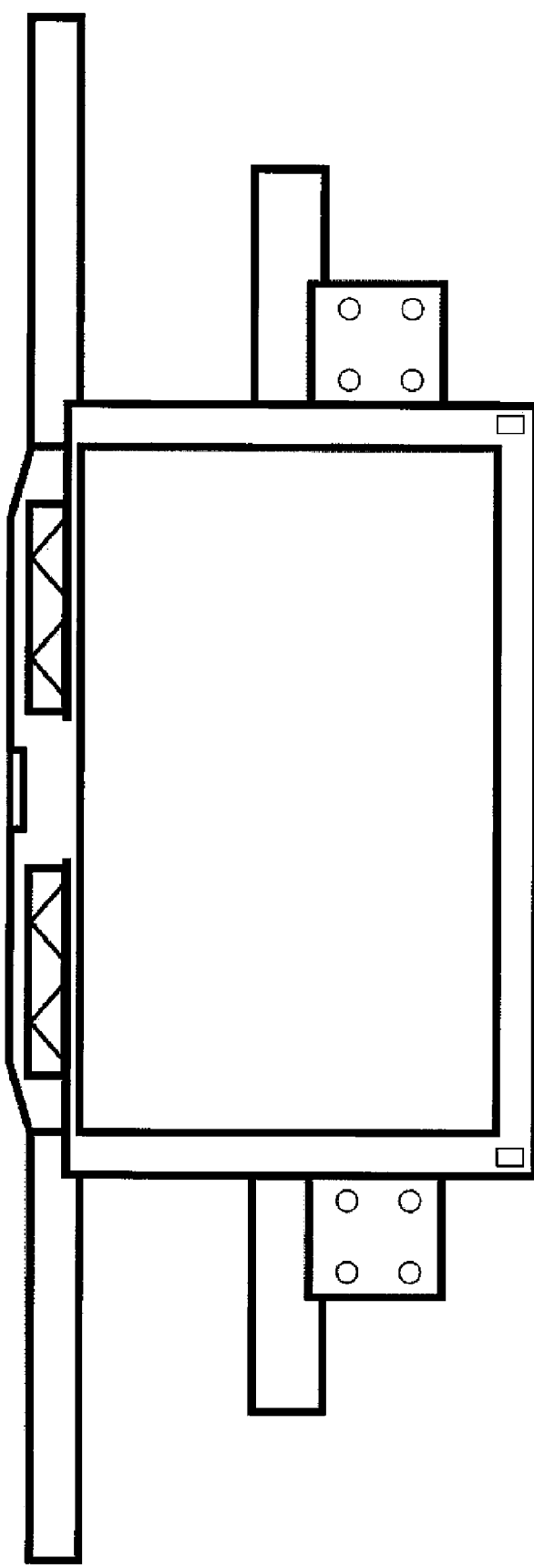
FIG. 5 is a front view of FIG. 1 in which the different plastics are not shown.

As a consequence, this results in a support structure for a front end, which, for the sake of simplicity, is shown in the front view in FIG. 5 without the different plastics being illustrated.

Figure 2:
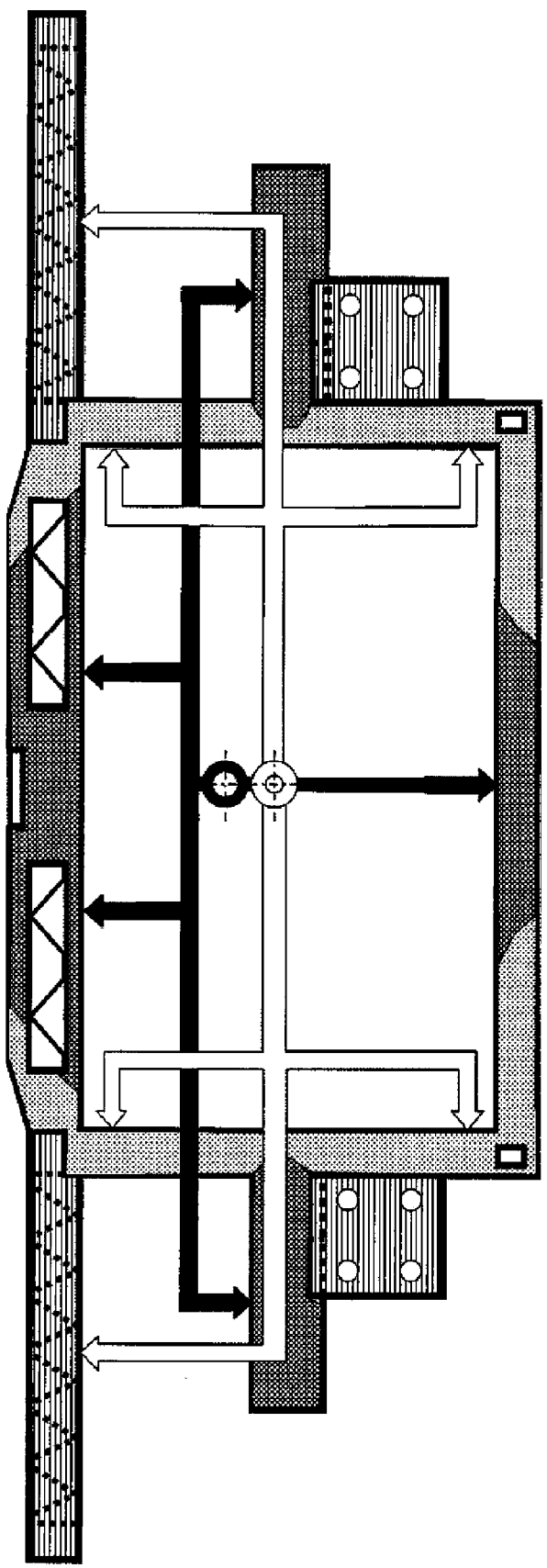
FIG. 2 shows the front end of a motor vehicle as shown in FIG. 1, with the gating system for the bi-injection process being illustrated.

A process for producing a front end can be carried out via a bi-injection process using the gating system shown in FIG. 2. Such a process comprises the following steps, for example:

The main body 1 is accommodated in the injection mold in a largely interlocking manner, with the exception of the cavities for the plastics components A and B. The regions 2 and 3 as shown in FIG. 1 are later produced by filling in the cavities.

After the injection mold has been closed, the adjoining injection-molding units simultaneously inject the respective quantities of plastic for the plastics components A and B. This is outlined schematically in FIG. 2 by different arrows, where the arrows filled in black and the arrows with a black outline each indicate different channels for the different plastics. Each channel is assigned to one of the plastics components A or B.

The injection pressure of the respective injection-molding unit makes the plastics melt A and B flow into the hot runner manifold to the hot runner nozzles into the cold runner manifold to the mold cavity. The hot runner nozzle could also be linked directly to the mold cavity. It is expedient to use hot runner needle valve nozzles in order to control the metering of the plastics components.

After completion of the injection process, it is conventional for a holding pressure to be applied to the plastics melt up to the sealing point of the feed points. The plastic is further cooled by way of the temperature-control system of the injection mold.

After about 25 to 50 seconds, depending on the wall thickness and size of the molded part, the mold can be opened and the multicomponent injection-molded part can be removed from the mold. The result is the injection-molded part shown in FIG. 5.

Bi-injection front ends can be produced in a normal injection-molding cycle of 35 to 120 seconds, depending on the size and weight of the article.

What is claimed is:

1. A front end of a motor vehicle, consisting of at least one main body and at least a first thermoplastic part and a second thermoplastic part, which are securely connected by injection molding firstly to a surface of the main body and simultaneously the various plastics parts are securely connected to one another, wherein the two plastics parts consist of different plastics materials and these fuse with one another when they encounter one another in a bi-injection process.

2. The front end of a motor vehicle as claimed in claim 1, wherein at least one of the plastics forms an interlocking connection with the main body, in particular with an edge of the main body which makes it possible for this plastics part to be displaced on the main body in at least one direction, preferably in the longitudinal direction of the plastics part.

3. The front end of a motor vehicle as claimed in claim 1, wherein the fusion of the two different plastics takes place within a cavity or cavities where they encounter one another.

4. The front end of a motor vehicle as claimed in claim 1, wherein the main body consists of metal or a high-strength plastics material.

5. The front end of a motor vehicle as claimed in claim 4, wherein the metal used for the main body is steel, aluminum or magnesium or alloys of these metals with other metals.

6. The front end of a motor vehicle as claimed in claim 1, wherein at least one plastic from the group consisting of polyamide, polyester, or polypropylene or possible mixtures of the polymers mentioned is selected as plastics.

7. The front end of a motor vehicle as claimed in claim 6, wherein the plastics materials to be processed differ in the content of fillers and/or reinforcing substances.

8. The front end of a motor vehicle as claimed in claim 1, wherein multipart main body is used, the individual parts of the main body being connected to one another by the injection-molding process via a thermoplastic part.

9. The front end of a motor vehicle as claimed in claim 8, wherein the multipart main body has vertical front-end supports and connection supports.

10. The front end of a motor vehicle as claimed in claim 9, wherein the thermoplastic part has a rectangular frame, the multipart main body being arranged on the vertical side parts of the frame.

11. The front end of a motor vehicle as claimed in claim 10, wherein the vertical front-end supports are arranged centrally between the horizontal side parts of the frame, and wherein the connection supports are arranged level with the upper horizontal side part of the frame.

12. The front end of a motor vehicle as claimed in claim 11, furthermore having lateral guide parts, wherein the guide parts consist of the material of the second thermoplastic part, and wherein the guide parts are fused with the first thermoplastic part via the bi-injection process.

13. The front end of a motor vehicle as claimed in claim 1, wherein all plastics surfaces are provided continuously with reinforcing ribs.

14. The front end of a motor vehicle as claimed in claim 2, wherein a fusion of the two different plastics takes place within the same cavity or cavities where they encounter one another.

15. The front end of a motor vehicle as claimed in claim 2, wherein the main body consists of metal or a high-strength plastics material.

16. The front end of a motor vehicle as claimed in claim 3, wherein the main body consists of metal or a high-strength plastics material.

17. The front end of a motor vehicle as claimed in claim 2, wherein all plastics surfaces are provided continuously with reinforcing ribs.

18. The front end of a motor vehicle as claimed in claim 3, wherein all plastics surfaces are provided continuously with reinforcing ribs.

19. The front end of a motor vehicle as claimed in claim 6, wherein all plastics surfaces are provided continuously with reinforcing ribs.

20. The front end of a motor vehicle as claimed in claim 8, wherein all plastics surfaces are provided continuously with reinforcing ribs.

* * * * *